United States Patent
Gray et al.

(10) Patent No.: US 7,792,919 B2
(45) Date of Patent: Sep. 7, 2010

(54) METHODS AND APPARATUS FOR PERFORMING DIAGNOSTICS OF WEB APPLICATIONS AND SERVICES

(75) Inventors: David W. Gray, Seattle, WA (US); John A. Cunningham, Kirkland, WA (US); Eric C. Lee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/107,263

(22) Filed: Apr. 15, 2005

(65) Prior Publication Data

US 2006/0235947 A1 Oct. 19, 2006

(51) Int. Cl.
*G06F 15/16* (2006.01)

(52) U.S. Cl. ............... 709/217; 709/218; 709/219

(58) Field of Classification Search ............ 709/217, 709/218, 219; 714/25
See application file for complete search history.

(56) References Cited

U.S. PATENT DOCUMENTS

| | | | | |
|---|---|---|---|---|
| 6,002,871 | A * | 12/1999 | Duggan et al. | 717/135 |
| 6,336,138 | B1 * | 1/2002 | Caswell et al. | 709/223 |
| 6,625,647 | B1 * | 9/2003 | Barrick et al. | 709/224 |
| 6,697,964 | B1 * | 2/2004 | Dodrill et al. | 714/38 |
| 6,721,941 | B1 * | 4/2004 | Morshed et al. | 717/127 |
| 7,330,887 | B1 * | 2/2008 | Dharmadhikari | 709/224 |
| 2001/0037490 | A1 * | 11/2001 | Chiang | 717/2 |
| 2002/0099818 | A1 * | 7/2002 | Russell et al. | 709/224 |
| 2002/0184165 | A1 * | 12/2002 | Deboer et al. | 706/1 |
| 2003/0005044 | A1 * | 1/2003 | Miller et al. | 709/203 |
| 2003/0120463 | A1 * | 6/2003 | Cox et al. | 702/186 |
| 2004/0210884 | A1 * | 10/2004 | Raghavachari et al. | 717/158 |
| 2005/0198649 | A1 * | 9/2005 | Zakonov | 719/318 |
| 2006/0203722 | A1 * | 9/2006 | Oommen | 370/229 |

* cited by examiner

*Primary Examiner*—William C Vaughn, Jr.
*Assistant Examiner*—Boris Gorney
(74) *Attorney, Agent, or Firm*—Wolf, Greenfield & Sacks, P.C.

(57) ABSTRACT

A method and apparatus for performing a diagnostic of a web based client server application. The web based client server application comprising a web application code, a web application framework, a web server, and a web client. The method comprising an act of collecting diagnostic data associated with the execution of the web application code, wherein the method of performing the diagnostic of the web based client server application adapts to a type of the web server. In another embodiment, marking the beginning and/or end of a diagnostic session, during which diagnostic data associated with the execution of the web application code is collected, is performed based on a launch of the web client. In a further embodiment, determining information about the web application code at least partially based on an interaction with the web application framework. In another embodiment, determining a type of the web server and starting the web server at least partially based on the determined type of the web server. In another embodiment, performing a diagnostic including code profiling, code coverage, and/or unit tests.

11 Claims, 10 Drawing Sheets

METHODS AND APPARATUS FOR PERFORMING DIAGNOSTICS OF WEB APPLICATIONS AND SERVICES

FIELD OF INVENTION

The present invention relates to performing diagnostics of web applications.

BACKGROUND

A conventional profiler for a desktop application can readily derive information to allow for the collection of data from a desktop application based on user supplied strings provided when the user launches the desktop application. This information includes the location of the desktop application on disk, a working directory, and a parameter list. With this information, along with a list of additional modules of interest, and the ability to inject a profiler helper into the desktop application, the profiler can perform any necessary preprocessing on the application code and then launch the application under its control. All lifetime and communication issues can be managed with this knowledge and level of control.

Figure 1:
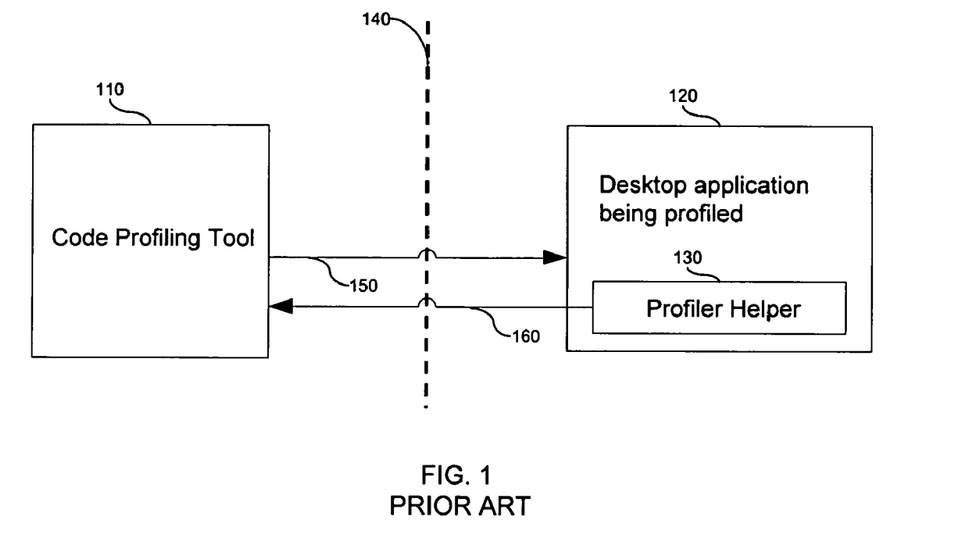
FIG. 1 is a block diagram of a conventional prior art profiler for a desktop application.

FIG. 1 illustrates a block diagram for a conventional prior art profiler for a desktop application. A system 100 includes a code profiling tool 110, a desktop application being profiled 120, and a profile helper 130. The profile helper 130 may be injected into the desktop application being profiled 120 and may collect profiling data during the execution of the desktop application 120. For example, the profiler helper 130 may collect data at regular sampling intervals. Furthermore, the code profiling tool 110 may initiate the code profiling session by launching 150 the desktop application. To accomplish the data collection, the code profiling tool 110 may instrument one or more executables (i.e., binary files) of the desktop application 120, whereby probe instructions are inserted into one or more executable files (e.g., application executables, shared libraries, etc.) associated with the desktop application 120, and the probe instructions can send 160 profiling data to the code profiling tool 110. Examples of the profiling data may include a call stack chain, call counts, call cost, memory usage, CPU usage, and I/O operations. In such a system 100, a process boundary 140 between the desktop application being profiled 120 and the code profiling tool 110 is well-defined, thereby facilitating the profiling process.

BRIEF DESCRIPTION OF DRAWINGS

In the drawings, each identical or nearly identical component that is illustrated in various figures is represented by a like numeral. For purposes of clarity, not every component may be labeled in every drawing. In the drawings.

SUMMARY

In accordance with one embodiment, a method of performing a diagnostic of a web based client server application, the web based client server application comprising a web application code, a web application framework, a web server, and a web client. The method comprising an act of collecting diagnostic data associated with the execution of the web application code, wherein the method of performing the diagnostic of the web based client server application adapts to a type of the web server.

In accordance with another embodiment, at least one computer readable medium encoded with a plurality of instructions for performing a diagnostic of a web based client server application, the web based client server application comprising a web application code, a web application framework, a web server, and a web client. The plurality of instructions, when executed, performing a method comprising collecting diagnostic data associated with the execution of the web application code, wherein the method of performing the diagnostic of the web based client server application adapts to a type of the web server.

In accordance with another embodiment, at least one computer for use with a computer system comprising a web based client server application, the web based client server application comprising a web application code, a web application framework, a web server, and a web client. The at least one computer comprising at least one processor programmed to collect diagnostic data associated with the execution of the web application code, wherein collecting the diagnostic data of the web based client server application adapts to a type of the web server.

DETAILED DESCRIPTION

Applicants have appreciated that in the case of a web based application (e.g., an ASP.NET application), the approach used to diagnose (e.g., profile) a desktop application is deficient. One problem may be that the application code a user may be interested in collecting diagnostic information about may not be directly tied to any component directly launched by the user. This may be an issue when determining how to launch the web application, how to assess the lifetime during which diagnostic data should be collected, and how to determine where the web application code may actually be running.

Figure 2:
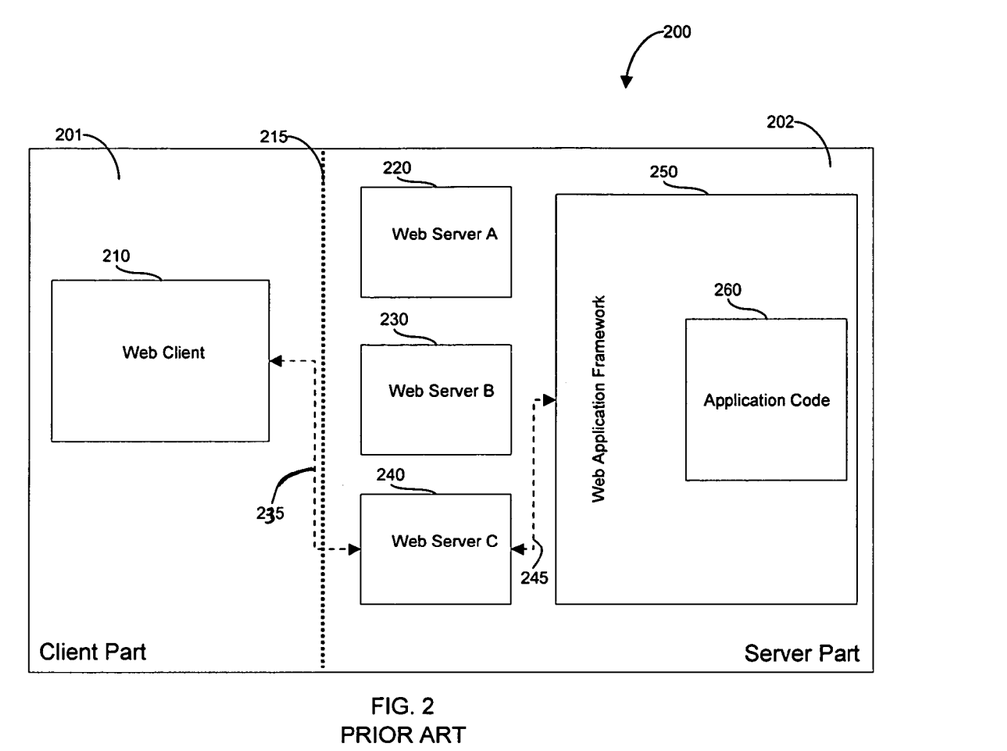
FIG. 2 is a block diagram of a prior art web based client server application.

FIG. 2 illustrates a block diagram of a prior art system 200 for a web based client server application, including a client part 201, a server part 202, and a boundary 215 between the client part 201 and the server part 202. The client part 201 includes a web client 210 (e.g., a web browser), which can access a web page hosted on the server part 202. The server part 202 includes an application code 260 which may be executed by a web application framework 250 (e.g., ASP-.NET) so as to generate a web page accessed by the web client 210. The web page generated by the web application framework 250 may be served to the web client 210 via a web server 240. The server part may also include any number of other web servers 220 and 230, and each web server may be of a different type and/or configuration. For example, web servers 220 and 230 may comprise types of web servers that run as services (e.g., Internet Information Servers), and web server 240 may be a web server type that runs as an application (e.g., webdev.webserver.exe). An example of web server configurations may include running the web server in different isolation modes.

In the example of FIG. 2, as noted by dashed lines 235 and 245, the web client 210 may interact with the web server 240, the web server 240 may interact with the web application framework 250, and the web application framework 250 may interact with the application code 260. When one of the other web servers 220 or 230 is active, a new interaction pathway may be established through the active web server. Furthermore, different web server types may entail different configurations. For example, some web servers may use a default port while others are configured with a new port number upon launch, and the web client 210 may be run based on the port that the web server may be listening to.

Applicants have appreciated that viewing a web based client server application system as an integrated system enables performing the same types of diagnostics (e.g., profiling, code coverage, unit tests, etc.) on a web application that can be performed with a conventional diagnostic tool on a desktop application. Furthermore, to aid in the collection of diagnostic data (e.g., profiling data, code coverage data, unit tests data, etc.) for a web application, Applicants have appreciated that it is beneficial to provide the ability to control a web application in a deterministic way irrespective of what type and/or configuration of web server hosts the web application.

In accordance with various embodiments of the invention, collecting diagnostic data associated with the execution of web application code by using an abstraction helper that can adapt to the type and/or configuration of server components (e.g., web server, web application framework). In accordance with some embodiments of the invention, collecting diagnostic data associated with the execution of web application code by using an abstraction helper that can adapt to the type and/or configuration of a web server, wherein the web server may be configured to run as different process identities and in different isolation modes.

In accordance with further embodiments of the invention, controlling a web application in a deterministic way irrespective of what type of web server hosts the web application.

In accordance with a further embodiment of the invention, controlling the web server and the web client to make the lifetime of the web application deterministic, therefore ensuring that even though the application for which diagnostic data being collected is the web application code on the server part, the beginning and end of a diagnostic session can be managed based on the web client's lifetime.

In another embodiment, enlisting a web application framework to provide information about a web application of interest for which diagnostic data will be collected.

Figure 3A:
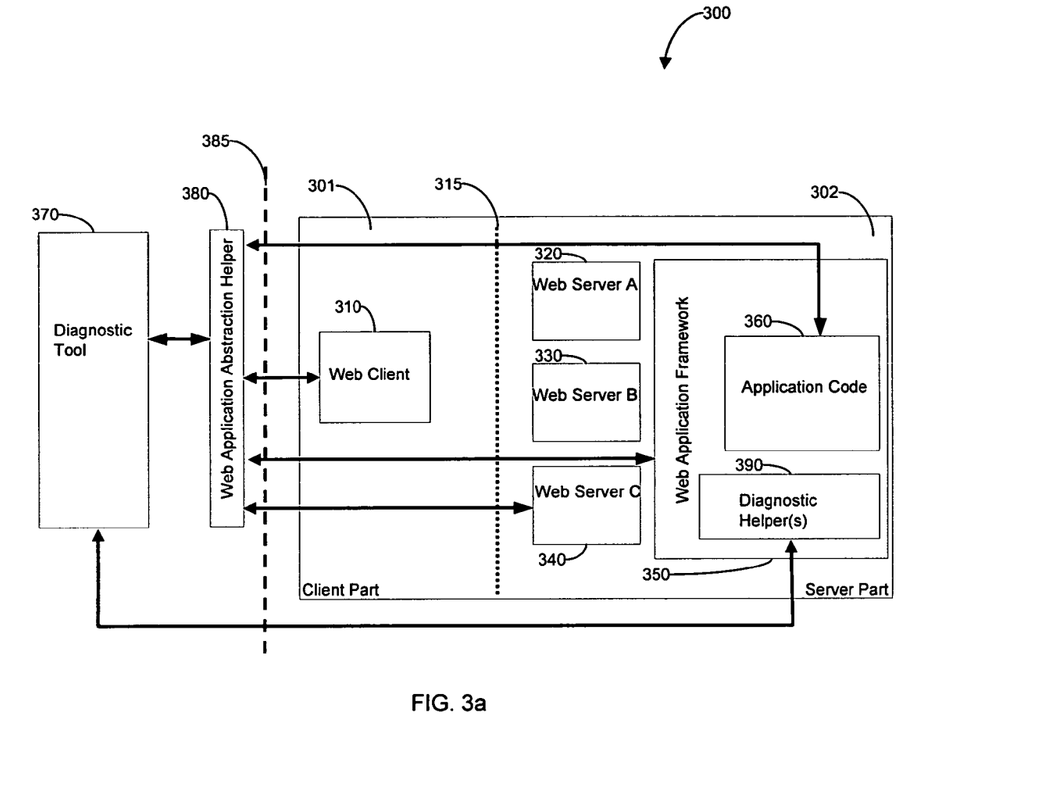
FIG. 3a is a block diagram of a system including components that perform a diagnostic on a web application code in accordance with one embodiment of the invention.

FIG. 3a illustrates a block diagram of a system 300 which includes components performing a diagnostic session on a web application code 360. The web application code 360 resides on a server part 302, and a web client 310 resides on a client part 301. A boundary 315 may be present between the client part 301 and the server part 302. The web client 310 (e.g., a web browser) can access a web page hosted on the server part 302. The server part 302 includes the application code 360 which may be executed by a web application framework 350 (e.g., ASP.NET) so as to generate the web page accessed by the web client 310. The web page generated by the web application framework 350 may be served to the web client 310 via one of the web servers 320, 330, or 340, where each web server may be of a different type and/or configuration. For example, web servers 320 and 330 may be web servers that run as services (e.g., Internet Information Servers), and web server 340 may be a web server that runs as an application (e.g., webdev.webserver.exe). It should be appreciated that this is merely one example of possible types of web servers, and any other types are possible, as the invention is not limited in this respect.

Depending on which web server (320, 330, or 340), hosts the web page accessed by the web client 310, an interaction pathway may be established through that web server (320, 330, or 340), the web application framework 350 and the application code 360, as described previously in relation to FIG. 2. Furthermore, different web server types and/or configurations may entail different component interactions. For example, some web servers types may use a default port while others are configured with a new port number upon launch, and the web client 310 may be run based on the port that the web server (320, 330, or 340) may be using.

A diagnostic tool 370, a web application abstraction helper 380, and a diagnostic helper(s) allow for the collection of diagnostic data associated with the execution of the web application code 360. The diagnostic tool 370 may initiate a diagnostic session, send instructions to the web application abstraction helper 380, receive information from the web application abstraction helper 380, and receive collected data from the diagnostic helper(s) 390. Upon receiving the collected data, the diagnostic tool 370 may analyze the data and present results of the diagnostic session to a user. In one embodiment, the diagnostic includes code profiling of the web application code 360. In another embodiment, the diagnostic includes code coverage of the web application code 360, and in yet another embodiment, the diagnostic may be one or more unit tests of the application code 360. It should be appreciated that the diagnostic session may include any type of diagnostic performed on the web application code 360, and the invention is not limited to the particular diagnostic types mentioned above.

The web application abstraction helper 380 serves as an interface between the diagnostic tool 370 and the web based client server application that may comprise the client pat 301 and the server part 302. The web application abstraction helper 380 may perform actions that may be adapted to the specific details of components on the client part 301 and/or server part 302, and therefore serves as an abstraction layer that enables the diagnostic tool 370 to interact with different component types and configurations. In some embodiments, the diagnostic tool 370 may include the web application abstraction helper 380, as the invention is not limited to the embodiment where the web application abstraction helper 380 and the diagnostic tool 370 are distinct processes.

In one embodiment, the web application abstraction helper 380 interrogates resources in system 300 to determine information that allows for the appropriate diagnostic session to be launched. The information discovered during the interrogation can include web server type, a web site of interest, a web page that should start in the web client 310 to start the diagnostic session, a mapping between a virtual path (e.g., http://localhost/mysite) and a physical path (e.g., c:\inetpub\wwwroot\mysite), a process in which the web application framework 350 may be executing, a process identity and an impersonation identity under which the web application code 360 executes.

For different types of diagnostic sessions (e.g., profiling, code coverage, unit tests), the components that are interrogated by the web application abstraction helper 380 may be different. The active web server (320, 330, or 340) and the web application framework 350 may be interrogated and provide some information. In some types of diagnostic sessions, information may also be provided by the diagnostic tool 370. For example, the diagnostic tool 370 may provide information about the web site of interest and the web page that will start the application code 360. In another example, the web abstraction tool 380 may interrogate the web server (320, 330, or 340) that will host the web page to determine the type of the web server (320, 330, or 340).

Examples of information gathered by the web application abstraction helper 380 that allows a launch of different types of diagnostic sessions follow. For sample based profiling, a process identity of the web application may be gathered. For instrumented profiling, code coverage, and unit tests, a physical path to the web application code 360 and a mapping between URL physical and virtual paths may be gathered. For profiling, a start page to invoke the client application may be gathered. It should be appreciated that the invention is not limited to any particular information gathered so as to launch a diagnostic session, and any other resources may be interrogated to gather any information.

The web application abstraction helper 380 may interact with the web client 310, the application code 360, the web server 340 that will host the web page of interest, and the diagnostic helper(s) 390. The web application abstraction helper 380 may launch the web client 310, and receive an indication, from the web client 310, that the launched web client 310 operation may be complete. The web application abstraction helper 380 can also insert debug information into the application code 360. For example, a request may be issued from the web application abstraction helper 380 to the web application framework 350 to generate debug information for the web application code 360 so that human readable symbols and line numbers may be associated with machine addresses that may be returned by the diagnostic helper(s) 390.

The web application abstraction helper 380 may communicate with the web server 340 that will host the web page of interest to determine the type of the web server 340 and also determine the web server 340 settings and/or parameters that should be altered to enable the diagnostic session. The web application abstraction helper 380 can communicate with the web application framework 350 to determine a process identity and impersonation identity under which the web application code 360 may be running. For example, a handler may be inserted into the context of the web application code 360, and upon sending a query to the web server (320, 330, or 340), the handler (running in the context of the web application framework 350) may answer the query with the process identity and impersonation identity.

As should be appreciated from the aforementioned, the web application abstraction helper 380 can perform various communications with the web based client server application (301 and 302), via a process boundary 385, and with the diagnostic tool 370. Theses are just examples of possible communications between the abovementioned components, and communication between other components is possible, as the invention is not limited in this respect.

The diagnostic helper(s) 390 may comprise one or more components present on the server part 302 of the web based client server application and that may collect diagnostic data relating to the execution of the application code and may optionally perform other functions based on the type of diagnostic being performed. Collected data may depend on the type of diagnostic being performed and can include code profiling data, code coverage data, and unit tests results. Once data is collected, the diagnostic helper(s) 390 can send diagnostic data to the diagnostic tool 370, which may then analyze the collected data. It should be appreciated that the location of the diagnostic helper(s) 390 in the server part 302 may depend on the web server type and/or configuration, and/or the type of diagnostic session being performed. In some instances, the diagnostic helper(s) may reside within the application code 360, in the web application framework 350, or in a combination thereof. As such, the location of the diagnostic helper(s) 390 illustrates the ability of the diagnostic helper(s) to reside on different locations in the server part 302, and the invention is not limited to locating the diagnostic helper(s) to any particular location in the web based client server application.

Furthermore, the interactions and process boundaries between the components presented in FIG. 3a may vary depending on the web server type and/or configuration, the diagnostic type, and any other variable that may influence process boundaries and component interactions. Therefore, the process boundaries and component interactions are presented as examples, and other variations are possible.

Figure 3B:
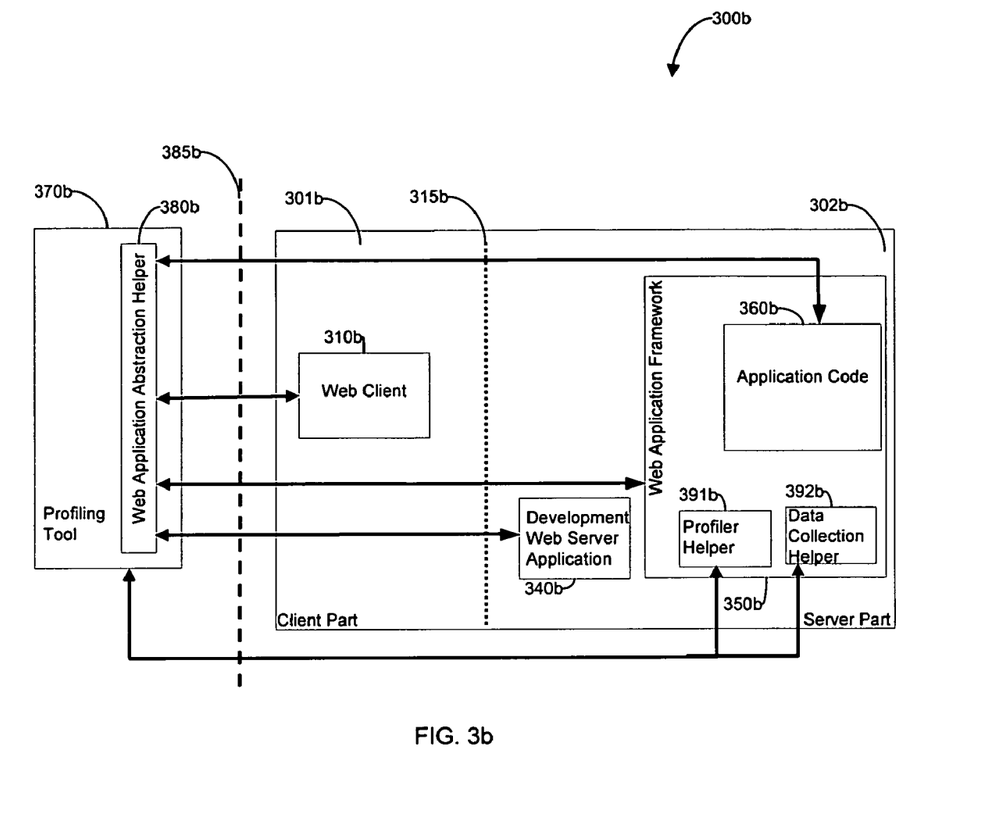
FIG. 3b is a block diagram of a system including components that perform a sampling profile on a web application code in accordance with one embodiment of the invention.
Figure 3C:
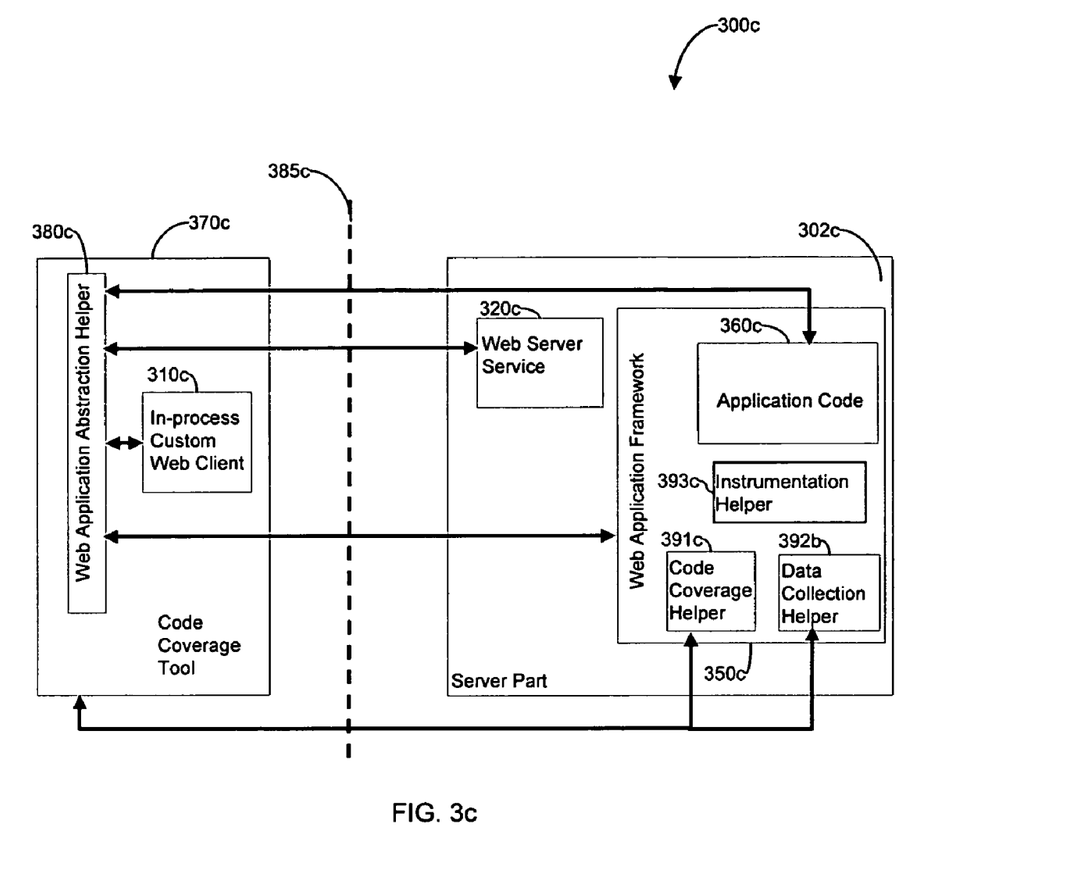
FIG. 3c is a block diagram of a system including components that perform code coverage on a web application code in accordance with one embodiment of the invention.

To illustrate various embodiments based on variations of system 300 shown in FIG. 3a, embodiments are presented in FIGS. 3b and 3c that are specific to different types of diagnostics, types of web servers, and configurations of the web server. It should be appreciated that these are just some of the possible combinations of different types of diagnostics, types of web servers, and configurations of the web server that may be handled, and the invention is not limited to the embodiments shown in FIGS. 3a and 3b.

FIG. 3b is a block diagram of a system 300b including components that perform a sampling profile on a web application code. System 300b includes a profiling tool 370b, where the profiling tool 370b includes the web application abstraction helper 380b. A web application code 360b resides on a server part 302b, and a web client 310b resides on a client part 301b. A boundary 315b may be present between the client part 301b and the server part 302b. The web client 310b (e.g., a web browser) can access a web page hosted on the server part 302b. The server part 302b includes the application code 360b which may be executed by a web application framework 350b (e.g., ASP.NET) so as to generate the web page accessed by the web client 310b. The web page generated by the web application framework 350b may be served to the web client 310b via a development web server application 340b. A profiler helper 391b and a data collection helper 392b (referred to as the diagnostic helpers) may be present on the server part and may aid in performing the profiling and collecting the profiling data 392b. As discussed in connection with FIG. 3a, the web application abstraction helper 380b can perform various communications with the web based client server application (301 and 302) via a process boundary 385b, and can adapt to the type and/or configuration of the components.

FIG. 3c is a block diagram of a system 300c including components that perform code coverage on a web application executing on a service web server in standard isolation. System 300c includes a code coverage tool 370c, where the code coverage tool 370b includes the web application abstraction helper 380b and an in-process custom web client 310c. A web application code 360c resides on a server part 302c. The in-process custom web client 310c can access a web page hosted on the server part 302c. The server part 302c includes the application code 360c which may be executed by a web application framework 350c (e.g., ASP.NET) so as to generate the web page accessed by the in-process custom web client 310c. The web page generated by the web application framework 350c may be served to the web client 310c via a web server service 320c in standard isolation. A code coverage helper 391c, a data collection helper 392b, and an instrumentation helper 393c (referred to as diagnostic helpers) may be present on the server part 302c and may aid in performing the code coverage session, collecting the code coverage data, and instrumenting the web application code 360 binaries. Optionally, the instrumentation helper 393c may also provide a notification when the web application code 360 binaries are built. As discussed in connection with FIG. 3a, the web application abstraction helper 380c can perform various communications with the components on the server part 302c via a process boundary 385c, and can adapt to the type and/or configuration of the components.

Figure 4:
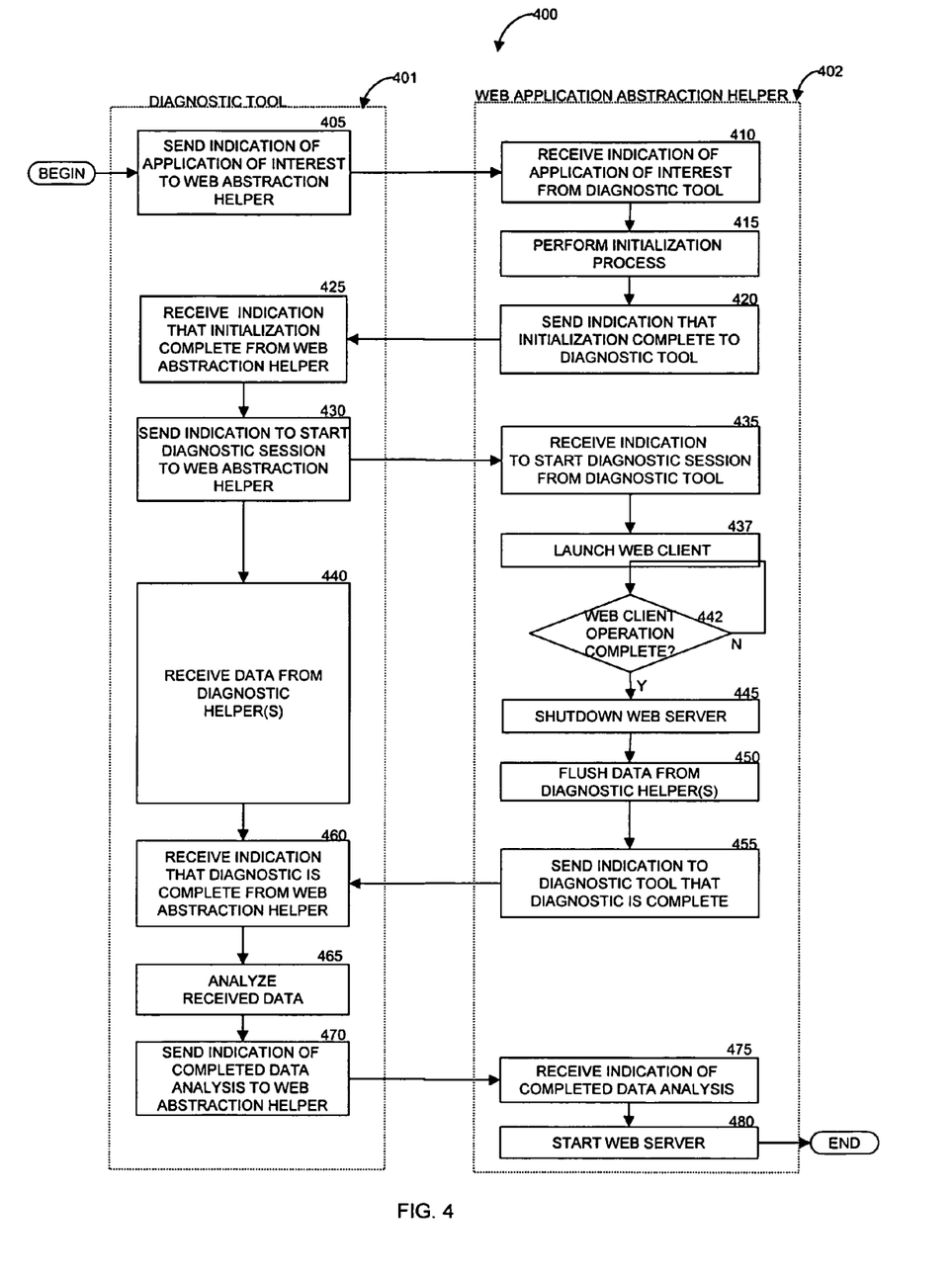
FIG. 4 is a flow chart for performing a diagnostic on a web based client server application in accordance with one embodiment of the invention.

FIG. 4 is a flow chart illustrating one embodiment of a diagnostic process 400 for a web based client server application. The diagnostic process 400 may comprise any process which collects diagnostic data associated with the execution of web application code, and may include code profiling, code coverage, unit tests, etc., as the invention is not limited in this respect. In the illustration of FIG. 3a, the diagnostic process 400 may be performed by the diagnostic tool 370 and the web application abstraction helper 380, such that the diagnostic tool 370 performs acts associated with process 401 and the web application abstraction helper 380 performs acts associated with process 402. In other embodiments, some or all of the acts in process 400 may be performed by one or more components, and need not be partitioned into processes 401 and 402 performed by two separate components.

The diagnostic process 400 begins in act 405, where the diagnostic tool 370 sends an indication of a web application of interest to the web application abstraction helper 380. In some embodiments, the web application of interest may be specified by providing a URL address that may cause the web application code 360 to begin executing. In other embodiments, the web application of interest may be specified by providing a URL address of the home page for the web site generated by the execution of the web application code 360.

In act 410, the web application abstraction helper 380 receives the indication of the web application of interest that should be diagnosed. The web application abstraction helper 380 then proceeds to act 415, where an initialization process may be performed, which may vary according to the type of diagnostic (e.g., code profiling, code coverage, unit tests) that is being performed and the type and/or configuration of the web server.

Figure 5:
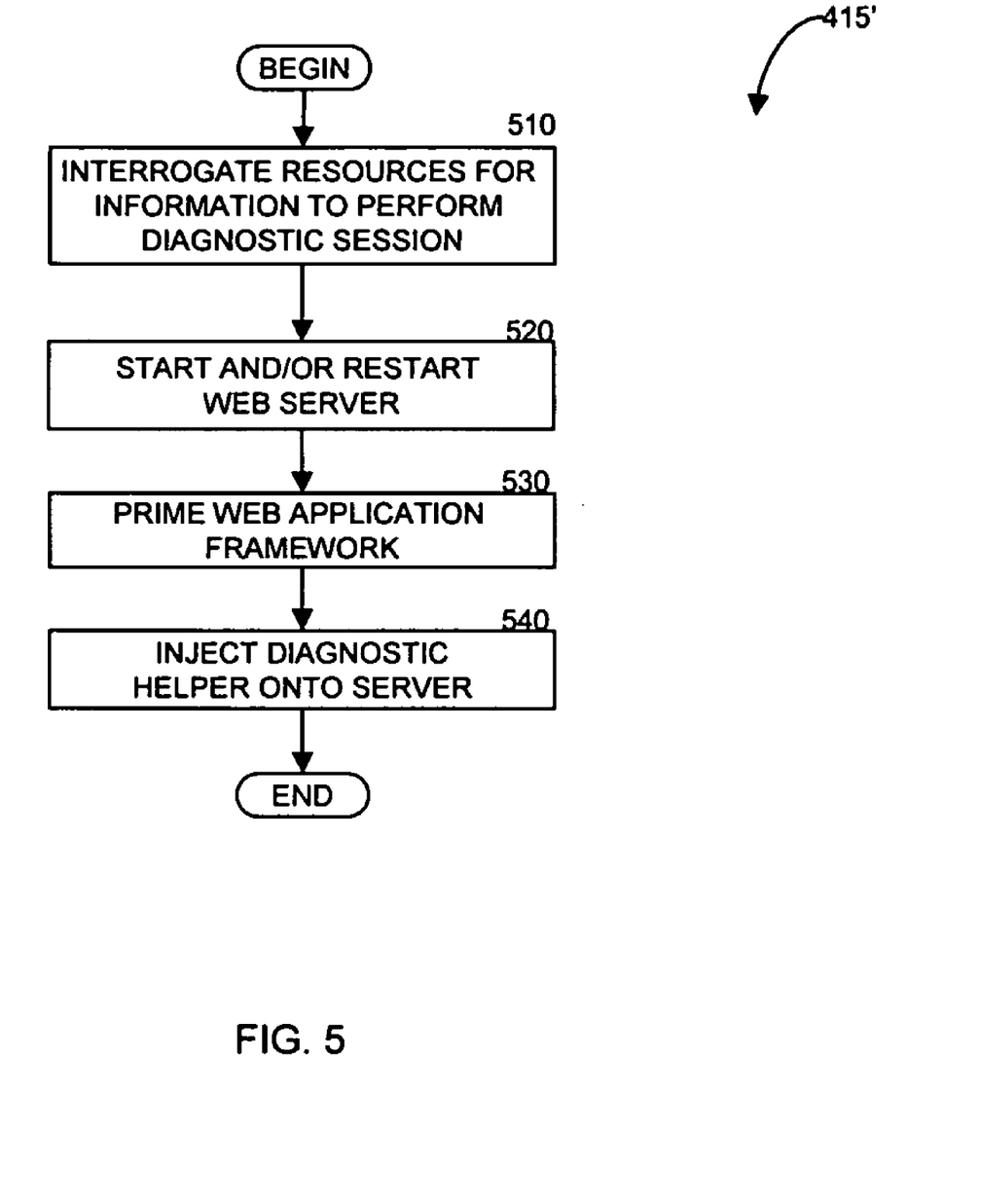
FIG. 5 is a flow chart for an initialization process in accordance with one embodiment of the invention.

FIG. 5 is a flow chart illustrating one embodiment of an initialization process 415'. As noted, variations of this process may be used for different types of diagnostics, and the acts presented in process 415' are only examples of acts performed during an initialization process, as the invention is not limited in this respect.

In act 510, resources are interrogated to determine any information that may allow the diagnostic session to be performed. The resources being interrogated may include any component of the web based client server application (301 and 302), the diagnostic tool 370, and/or any other resource, as the invention is not limited in this respect.

As previously mentioned, the information discovered during the interrogation can include the web server type, a web site of interest, a web page that should start in the web client 310 to start the diagnostic session, a mapping between a virtual path (e.g., http://localhost/mysite) and a physical path (e.g., c:\inetpub\wwwroot\mysite), a process in which the web application framework 350 may be executing, a process identity and an impersonation identity under which the web application code 360 executes.

For different types of diagnostic sessions (e.g., profiling, code coverage, unit tests) the components that are interrogated may be different. The active web server (320, 330, or 340) and the web application framework may provide some of the information. In some types of diagnostic sessions, information may also be provided by the diagnostic tool 370. For example, the diagnostic tool 370 may provide information about the web site of interest and the web page (i.e., URL address) that will execute the application code 360. In another example, the web abstraction tool 380 may interrogate the web server (320, 330, or 340) that will host the web page to determine the type of the web server (320, 330, or 340). Furthermore, the web abstraction tool 380 need not interrogate all the aforementioned resources, when information that those resources possess has previously been supplied to the web abstraction tool 380. For instance, in the process 400 illustrated in FIG. 4, the diagnostic tool 370 may send an indication of the application of interest to the web application abstraction helper 380 (in act 405), therefore the web application abstraction helper 380 need not interrogate the diagnostic tool 370 to determine the aforementioned information.

In act 520, the web server (320, 330 or 340), that will host the web page (generated from the web application code 360 that is to be diagnosed), may be started and/or restarted so as to allow for the collection of the diagnostic data. Act 520 may in turn involve one or more steps to start and/or restart the web server (320, 330 or 340), which may vary according to the type of the web server (320, 330 or 340) that will host the web page.

Figure 6:
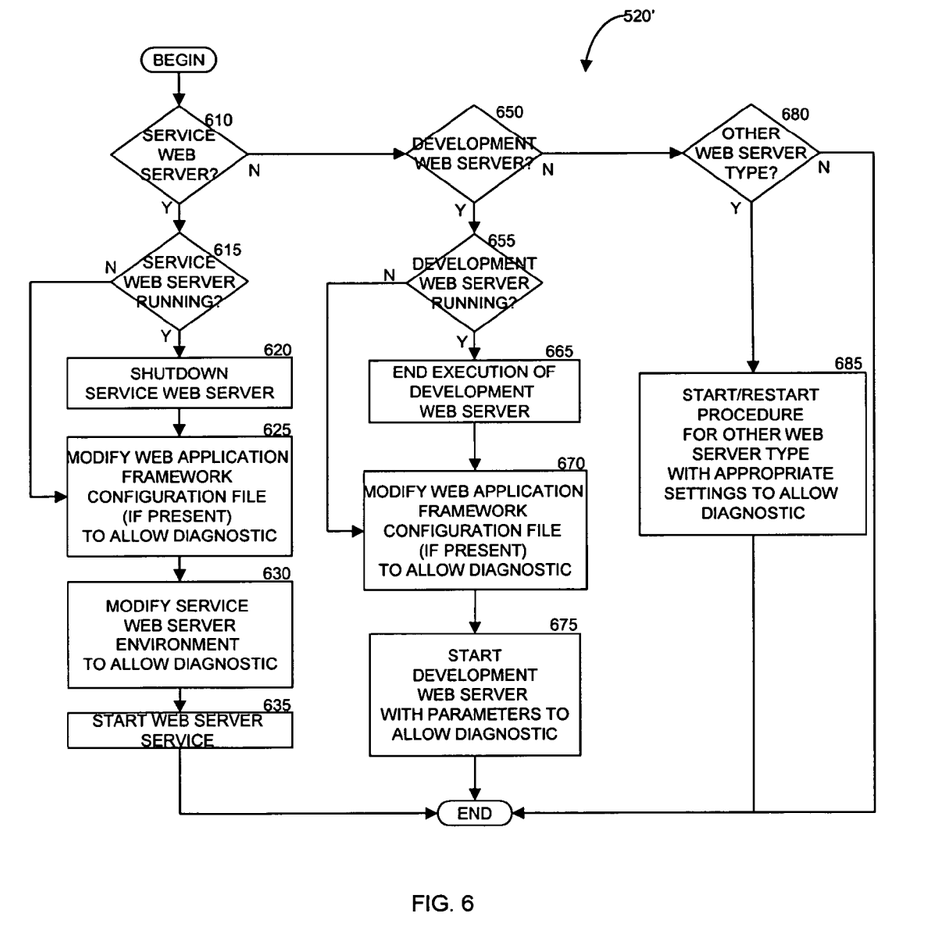
FIG. 6 is a flow chart for a web server start and/or restart process in accordance with one embodiment of the invention.

FIG. 6 is a flow chart illustrating one embodiment of web server start and/or restart process 520' to enable the settings and parameters that allow for the desired diagnostic to be performed. As noted above, process 520' may perform different actions depending on the type of the web server (320, 330 or 340) hosting the web page. For instance, a service web server may involve a modification of the web server environment settings, whereas a development web server may be launched with appropriate parameters to allow the collection of the desired diagnostic data.

Process 520' begins in act 610, where a determination may be made as to whether the web server is a service web server. When this is the case, process 520' proceeds to determine whether the service web server is running (in act 615), and if so, the service web server may be shutdown (act 620). Otherwise, when the service web server is not running, or after the shutdown in act 620 is complete, the process proceeds to act 625 where a modification may be made to the web application framework configuration file, in cases when such a file is present.

The modification to the web application framework configuration file may involve modifying parameters that set up the web server for the desired diagnostic. For example, in the case of the ASP.NET web application framework, the configuration file (i.e., named web.config) may be modified.

In the case of an instrumented profiling, a tag may be added to the compilation section of the web.config configuration file that indicates a fully qualified name of a class that may be used to instrument assemblies of the web application after assembly compilation by the web application framework 350. An assembly binding part may be added to the runtime section so as to instruct the common language runtime (CLR) where the assemblies that implement the aforementioned class are physically located on the storage disk. A key may be added to the app settings section that provides a name of the interprocess communication object used to communicate between the instrumenting class and the rest of the diagnostic helper(s) 390 code.

In act 630, the process also modifies environment settings of the service web server, so as to allow the desired diagnostic to be performed. The modification made to the environment settings of the service web server may vary depending on the type of diagnostic being performed. After the environment settings and the web application framework configuration file have been modified, the process proceeds to start the web server service with the modified environment and settings (act 635), and then the web server start and/or restart process 520' may terminate.

As noted, the sequence of actions performed during the web server start and/or restart process 520' varies depending on the type of the web server (320, 330 or 340) that will host the web page. In act 610, when it is determined that the web server (320, 330 or 340) that will host the web page is not a service web server, the process proceeds to act 650, where a determination is made as to whether the web server (320, 330 or 340) that will host the web page is a development web server (in act 650). A development web server may be launched as an application with runtime parameters, and as such may be launched with specific parameters to allow for the collection of diagnostic data for the specific web application code 360 of interest.

When it is determined that the web server (320, 330 or 340) that will host the web page is a development web server (in act 650), the process proceeds to act 655, where it is determined whether the development web server may be running. When this is the case, in act 665, the execution of the development web server may be terminated. Upon completion of act 665, or upon the determination that the development web server is not running (in act 655), a modification may be made to the web application framework configuration file, in cases when such a file may be present (act 670). The modification to the web application framework configuration file may involve modifying parameters that set up the web server for the desired diagnostic, as previously described in the context of act 630.

Then in act 675, the development web server may be launched as an application with runtime parameters that enable the collection of the diagnostic data. In the case of the development web server, the runtime parameters may provide a mapping of a virtual to physical path and pinning of the port number for the web application. The runtime parameters may also provide some of the same environment information as may be used in the case of a service web server (as previously described above).

Upon completion of the launch of the development web server, the web server start and/or restart process 520' may terminate.

Lastly, process 520' may be constructed to perform a start and/or restart procedure for any other type of web server, as the invention is not limited to any specific type of web servers. In act 650, when it is determined that the web server (320, 330 or 340) that will host the web page is a not development web server, the process proceeds to act 680 where a determination is made as to whether the web server (320, 330 or 340) may be of a recognized type. When the web server (320, 330 or 340) that will host the web page is not of a recognized type, the process may terminate and output, indicating that the web server may not be a recognized type, may be generated.

When it is determined that the web server (320, 330 or 340) hosting the web page is of a recognized type (in act 680), the process continues with act 685, and performs a start and/or restart procedure for the recognized type of web server with appropriate environment settings, parameters, and modified configuration files, etc., so as to allow for the collection of the desired diagnostic data. Process 520' then may proceed to terminate.

Upon completing the start and/or restart of the web server (in act 520), process 415' continues with act 530, where the web application framework may be primed with application code 360 that will be diagnosed. The priming process may involve sending a URL address to the web server (320, 330 or 340) which will cause the web application code 360 to be loaded.

Then in act 540, the diagnostic helper(s) 390 may be injected onto the server part 302 of the web based client server application (301 and 302). Depending on the type of diagnostic being performed, the diagnostic helper(s) 390 may be injected into different locations of the server part 302, as previously noted, and may comprise any number of separate diagnostic helpers(s) 390, as the invention is not limited in this respect.

Upon completion of the initialization process in act 415, process 400 continues with act 420, where an indication that the initialization process 415 is complete may be sent from the web application abstraction helper 380 to the diagnostic tool 370 (in act 420). Upon receiving the indication that the initialization process 415 is complete (in act 425), the diagnostic tool 370 may send an indication to the web application abstraction helper 380 to start the diagnostic session (in act 430). Act 430 may be invoked automatically upon the completion of act 425, or may be the result of receiving an instruction from a user to begin the diagnostic session.

Upon receiving the indication to start the diagnostic session (in act 435), the process proceeds with act 437, where the web client 310 may be launched. The launch of the web client 310 may include accessing the web page that will be generated by the application code 360. The launch of the web client 310 may also perform any other actions desired by the diagnostic. For example, the web client 310 may interact with the web page (or with more than one web page) in any manner prescribed by the diagnostic.

Upon launching the web client 310, the diagnostic helper(s) 390 may collect diagnostic data associated with execution of the application code 360 (by the web application framework 350) which generates one or more web pages that are hosted on the web server (320, 330 or 340) and accessed by the web client 310. Details associated with the process performed by the diagnostic helper(s) 390 will be described below in relation to FIG. 8.

After the web application abstraction helper 380 performs act 437 and launches the web client 310, the diagnostic tool 370 (in parallel with the concurrent process 402 that may be executed by the web application abstraction helper 380) proceeds to act 440 where diagnostic data from the diagnostic helper(s) 390 may be received. In the meanwhile, the web application abstraction helper 402 awaits the completion of the web client 310 operation (in act 442), and upon receiving an indication from the web client 310 that operation is complete, the web application abstraction helper 380 proceeds to shutdown the web server (320, 330 or 340).

Figure 7:
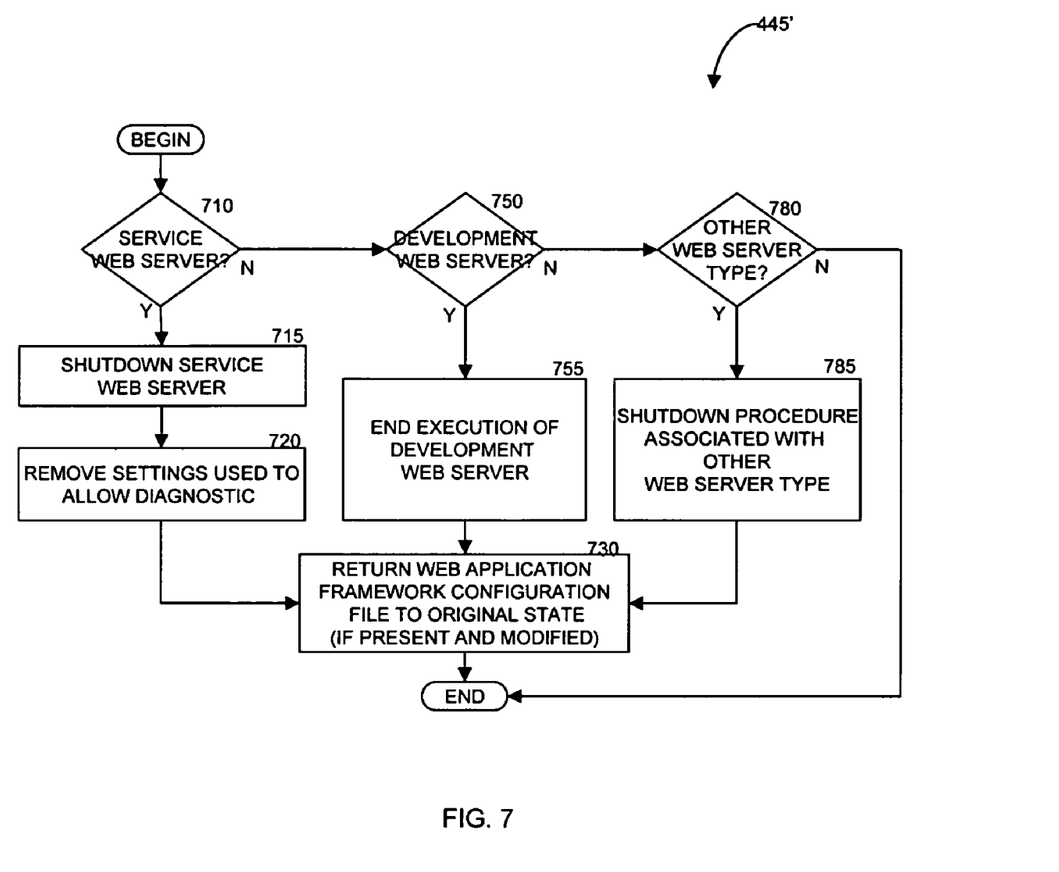
FIG. 7 is a flow chart illustrating one embodiment of a web server shutdown process in accordance with one embodiment of the invention.

FIG. 7 is a flow chart illustrating one embodiment of a web server shutdown process 445'. Process 455' begins with act 710, where a determination is made as to whether the active web server (320, 330 or 340) is a service web server. In such a case, the service web server may be shutdown (in act 715) and modified settings may be changed back to their original values prior to the diagnostic session (in act 720). Then in act 730, the web application framework configuration file may be modified back to the original state it was in prior to the diagnostic session (if a configuration file was present and modified), and process 455' may terminate.

When the active web server (320, 330 or 340) is not a service web server, the process continues and determines whether the active web server (320, 330 or 340) is a development web sever (in act 750). When the web server is a development web sever, the process proceeds to act 755 where the execution of the development web server may be terminated. Then in act 730, the web application framework configuration file may be modified back to the original state it was in prior to the diagnostic session (if a configuration file was present and modified), and process 455' may terminate.

When the active web server (320, 330 or 340) is not a development web server, the process continues and determines whether the active web server (320, 330 or 340) is any other recognizable web server type (in act 780). When the web server may not be recognizable, the process may terminate and issue an appropriate message indicating the presence of an unrecognized web server type. When the active web server is a recognized type, the process may continue with act 785 where a shutdown procedure for the recognized web server type may be performed prior to proceeding to act 730, and then process 445' may terminate.

Returning to FIG. 4, it should be appreciated that acts 437 and 442 may be modified depending on the type of diagnostic being performed. For example, in the case of a unit test diagnostic, steps 437 and 442 may be repeated any number of times as dictated by the desired number of repeats of the unit test.

Upon shutting down the web server (320, 330 or 340) in act 445, the web application abstraction helper 380 may proceed to instruct the diagnostic helper(s) 390 to send any remaining collected diagnostic data that has not yet been sent to the diagnostic tool 370 (act 450, flushing the data). Then in act 455, the web application abstraction helper 380 may send an indication to the diagnostic tool 370 that the diagnostic is complete.

Upon receiving the indication that the diagnostic is complete (in act 460), the diagnostic tool 370 may proceed to analyze the received diagnostic data in act 465, perform symbol packing, and optionally present the analyzed data to a user, store the diagnostic data for future use, and/or perform any other desired manipulation of the diagnostic data, as the invention is not limited in this respect.

The diagnostic tool then sends and indication to the web application abstraction helper indicating the completion of the data analysis (in act 470), and upon receiving this indication (in act 475), the web application abstraction helper 380 starts the web server (320, 330 or 340) using the appropriate start-up procedure for the type of web server present (in act 480).

In process 400, it should be realized that the analysis of the collected diagnostic data and symbol packing may be performed before the web server (320, 330 or 340) starts again (in act 480) and potentially rebuilds assemblies that may cause diagnostic data analysis to fail. Symbol packing may allow for the generation of usable diagnostic data, and involves the association of addresses in raw data with symbolic names. This can be accomplished by looking up addresses in debug information and managed metadata information. Application files that contain this information (i.e., pdb and dll files) may be rebuilt at any time while the web server is running and may create difficulties associating addresses in raw data with symbolic names. Symbol packing can solve this problem by storing the association of addresses in raw data with symbolic names into a data file (after shutdown of the web server and before restart), and therefore breaking the dependency on the symbolic information contained in the application files (i.e., pdb and dll files).

Figure 8:
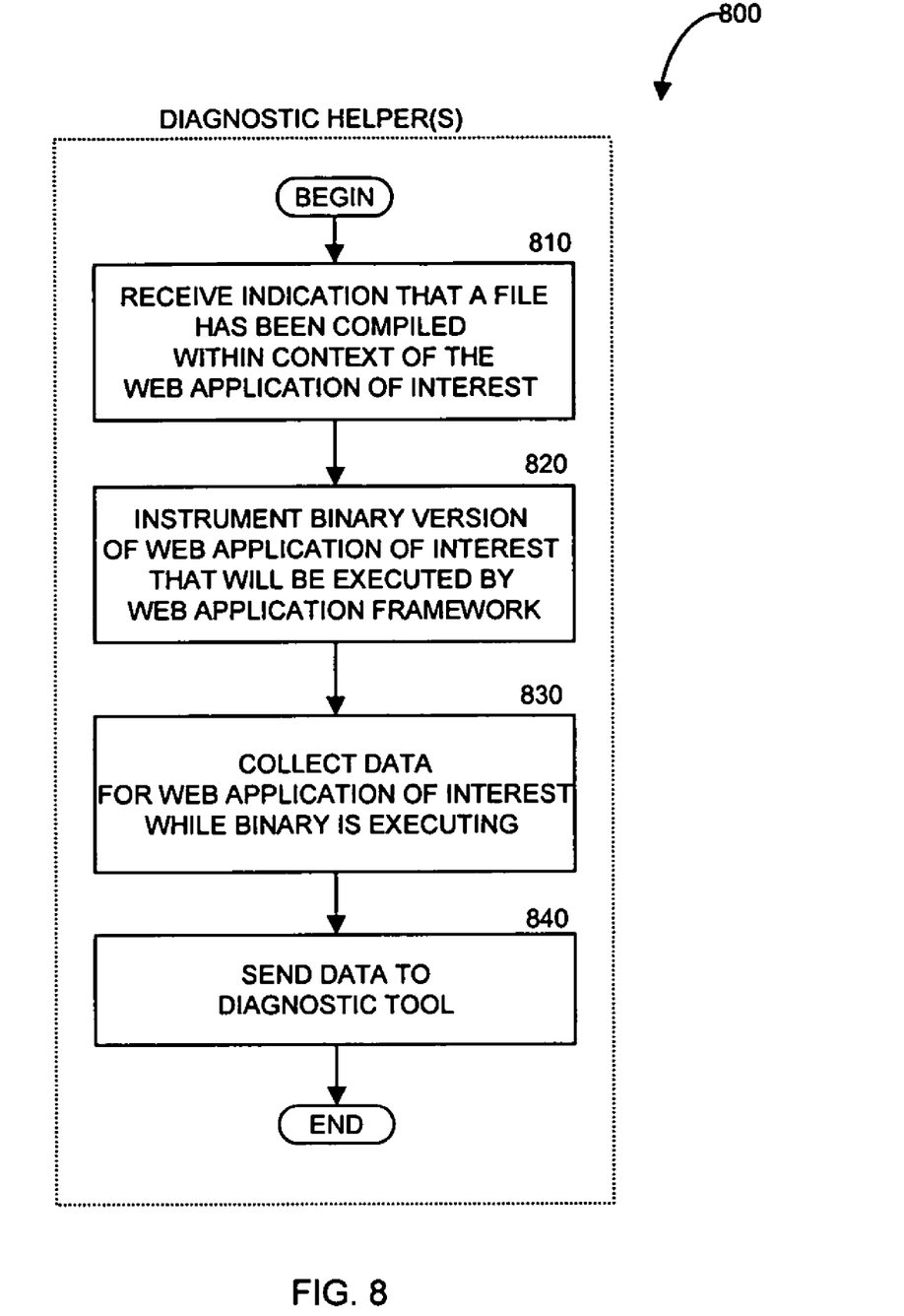
FIG. 8 is a flow chart illustrating a process performed by diagnostic helper(s) to collect diagnostic data in accordance with one embodiment of the invention.

FIG. 8 is a flow chart illustrating one embodiment of a process 800 that may be performed by one or more diagnostic helper(s) to collect diagnostic data during the execution of web application code. Process 800 is just one example of a process that may be performed by diagnostic helper(s) present on a web based client server application, and other process may be performed by diagnostic helper(s).

Process 800 begins in act 810, where an indication may be received that a file has been compiled within the context of the web application code 360 of interest.

In act 820, if desired for the diagnostic type being performed, the binary of the web application code of interest 360 may be instrumented. Instrumentation of the binary may involve inserting instruction probes into the binary, where the instruction probes may gather and send information to the diagnostic tool 370. This process may be different for types of diagnostics (e.g., instrumented profiling, code coverage), and may be similar to the instrumentation performed on desktop applications. In some types of diagnostics (e.g., units tests, sampling profiling), instrumentation need not be used to collect diagnostic data, and instead output generated by the web application code 360 may be collected.

Then the diagnostic tool 390 proceeds to collect diagnostic data during the execution of the web application code 360 of interest (act 830), and send the collected data to the diagnostic tool 840. As should be appreciated, numerous variations are possible as to when data is sent to the diagnostic tool and in what form the data is sent. For example, the collected data may be stored on a local file on the server part 302, which may then be accessed by the diagnostic tool 370. In such a case, the diagnostic helper(s) 390 may need to be assigned appropriate access privileges (which may be performed the web application abstraction helper 380) to write the collected data to a file on the server part 302. This is just one example of a method for collecting and sending data to the diagnostic tool 370 from the diagnostic helper(s) 390, as the invention is not limited in this respect.

As should be appreciated from the foregoing, there are numerous aspects of the present invention described herein that can be used independently of one another.

However, it should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:

1. A method of performing a diagnostic of a web based client server application, the web based client server application comprising a web application code, a web application framework, a web server, and a web client, the method comprising acts of:
    determining a type of the web server by interrogating one or more resources of the web based client server application;
    selecting, based at least partially on the determined type of the web server, a set of parameters to enable collection of diagnostic data;
    starting the web server with the set of parameters selected;
    modifying a configuration file of the web application framework to allow a desired diagnostic;
    collecting the diagnostic data associated with an execution of the web application code, wherein the method of performing the diagnostic of the web based client server application adapts to a type of the web server, wherein a diagnostic helper in the web application framework collects the diagnostic data associated with the execution of the web application code and provides the collected data to a diagnostic tool, and wherein a web application abstraction helper communicates with the web application code, the web application framework, the web server, the web client and the diagnostic tool, and performs actions specific to components of the web based client server application;
    marking a beginning of a diagnostic session during which the collecting is performed based on a launch of the web client; and
    marking an end of a diagnostic session during which the collecting is performed based on an end of an operation performed by the web client.

2. The method of claim 1, further comprising an act of determining information about the web application code at least partially by requesting the web application framework to generate debug information associated with the web application code.

3. The method of claim 1, wherein the diagnostic is a code profile of the web application code and wherein a profiler helper is injected into the web application framework to assist in a code profiling session of the web application code.

4. The method of claim 1, wherein the diagnostic is a code coverage of the web application code and wherein a code coverage helper is injected into the web application framework to assist in a code coverage session of the web application code.

5. The method of claim 1, wherein the diagnostic is a desired number of unit tests of the web application code and wherein the web client is launched the desired number of times.

6. At least one computer readable memory device encoded with a plurality of instructions for performing a diagnostic of a web based client server application, the web based client server application comprising a web application code, a web application framework, a web server, and a web client, the plurality of instructions, when executed, performing a method comprising:
    determining a type of the web server by interrogating one or more resources of the web based client server application;
    selecting, based at least partially on the determined type of the web server, a set of parameters to enable collection of diagnostic data;
    starting the web server with the set of parameters selected;
    modifying configuration settings of the web application framework based at least partially on a type of the diagnostic;
    collecting the diagnostic data associated with an execution of the web application code, wherein the method of performing the diagnostic of the web based client server application adapts to a type of the web server, wherein a diagnostic helper in the web application framework collects the diagnostic data associated with the execution of the web application code and provides the collected data to a diagnostic tool, and wherein a web application abstraction helper communicates with the web application code, the web application framework, the web server, the web client and the diagnostic tool, and performs actions specific to components of the web based client server application;

marking a beginning of a diagnostic session during which the collecting is performed based on a launch of the web client; and marking an end of a diagnostic session during which the collecting is performed based on an end of an operation performed by the web client.

7. The at least one computer readable memory device of claim 6, wherein the method further comprises an act of determining information about the web application code at least partially by requesting the web application framework to generate debug information associated with the web application code.

8. The at least one computer readable memory device of claim 6, wherein the diagnostic is a code profile of the web application code and wherein a profiler helper is injected into the web application framework to assist in a code profiling session of the web application code.

9. The at least one computer readable memory device of claim 6, wherein the diagnostic is a code coverage of the web application code and wherein a code coverage helper is injected into the web application framework to assist in a code coverage session of the web application code.

10. The at least one computer readable memory device of claim 6, wherein the diagnostic is a desired number of unit tests of the web application code and wherein the web client is launched the desired number of times.

11. At least one computer for use with a computer system comprising a web based client server application, the web based client server application comprising a web application code, a web application framework, a web server, and a web client, the at least one computer comprising:

at least one processor programmed to perform a diagnostic of the web based client server application, the processor programmed to:

determine a type of the web server by interrogating one or more resources of the web based client server application;

select, based at least partially on the determined type of the web server, a set of parameters to enable collection of diagnostic data;

start the web server with the set of parameters selected;

modify a configuration file of the web application framework to allow a desired diagnostic;

collect the diagnostic data associated with an execution of the web application code, wherein the processor programmed to perform the diagnostic of the web based client server application adapts to a type of the web server, wherein a diagnostic helper in the web application framework collects the diagnostic data associated with the execution of the web application code and provides the collected data to a diagnostic tool, and wherein a web application abstraction helper communicates with the web application code, the web application framework, the web server, the web client and the diagnostic tool, and performs actions specific to components of the web based client server application;

mark a beginning of a diagnostic session, during which the diagnostic data associated with the execution of the web application code is collected, based on a launch of the web client; and mark an end of a diagnostic session, during which the diagnostic data associated with the execution of the web application code is collected, based on an end of an operation performed by the web client.

* * * * *